(12) United States Patent
Samejima et al.

(10) Patent No.: US 8,266,879 B2
(45) Date of Patent: Sep. 18, 2012

(54) RIDING MOWER

(75) Inventors: Kazuo Samejima, Sakai (JP); Hironori Tsuchihashi, Sakai (JP); Kazuhiro Ochi, Sakai (JP); Masaji Kure, Sakai (JP)

(73) Assignee: Kubota Corporation, Osaka (JP)

( * ) Notice: Subject to any disclaimer, the term of this patent is extended or adjusted under 35 U.S.C. 154(b) by 407 days.

(21) Appl. No.: 12/556,257

(22) Filed: Sep. 9, 2009

(65) Prior Publication Data

US 2010/0077713 A1 Apr. 1, 2010

(30) Foreign Application Priority Data

Sep. 29, 2008 (JP) ................................. 2008-249864

(51) Int. Cl.
*A01D 34/00* (2006.01)
(52) U.S. Cl. ........................................................ 56/17.1
(58) Field of Classification Search ............... 56/10.2 R, 56/10.8, 11.3, 14.7, 14.9–15.2, 15.7–15.9, 56/17.1, 17.2, 320.1, DIG. 22

See application file for complete search history.

(56) References Cited

FOREIGN PATENT DOCUMENTS

| JP | 05260837 A | 10/1993 |
|---|---|---|
| JP | 06133631 A | 5/1994 |

*Primary Examiner* — Thomas B Will
*Assistant Examiner* — Mai Nguyen
(74) *Attorney, Agent, or Firm* — The Webb Law Firm

(57) ABSTRACT

A riding mower comprises a raising and lowering mechanism (30, 33, 100), the raising and lowering control lever (27), and a PTO mechanism (17*a*, 17*b*) operated by a clutch lever (29). When the raising and lowering mechanism (30, 33, 100) reaches a predetermined height, a operatively connecting mechanism (5) transmits, to the raising and lowering control lever (27), a return-to-neutral displacement for returning the raising and lowering control lever (27) to the neutral position, and transmits, to the clutch lever (29), a disengaging displacement for returning the clutch lever (29) to the disengage position. A first adjusting operation member (55*a*) adjusts a triggering displacement at which the raising and lowering displacement is transmitted to the raising and lowering control lever (27) as the return-to-neutral displacement. A second adjusting operation member (55*b*) adjusts a triggering displacement at which the raising and lowering displacement is transmitted to the clutch lever (29) as the disengaging displacement.

5 Claims, 6 Drawing Sheets

RIDING MOWER

BACKGROUND OF THE INVENTION

1. Field of the Invention

The present invention relates to a riding mower having a mower unit, a raising-and-lowering mechanism for vertically moving the mower unit, and the raising-and-lowering control lever which controls the raising and lowering mechanism.

2. Description of the Related Art

Examples of known riding mowers of the type mentioned above include ones with structures described in the following [1] and [2]:

[1] A riding mower having a structure in which a feedback operation is performed to shift the PTO speed change mechanism to neutral and to disengage the travel clutch as the lift arms reaches a predetermined height (JP Publication of Application No. H05-260837 (Paragraphs [0021], [0022], FIG. 5, FIG. 6)).

[2] A riding mower having a structure in which the raising and lowering control lever of the mower unit is returned to neutral and the PTO clutch lever for the PTO for driving mower is disengaged as the lift arms reaches a predetermined height (JP No. H06-133631 (Paragraphs [0011], [0012], FIG. 1)).

The riding mower described above in [1] uses a pivot plate which is pivoted as the lift arms reach the predetermined height, and a plurality of pivot members as cam followers which are pivoted in association with a movement of the cam portion formed in the pivot plate. And the riding mower is configured to provide a feedback of the movement of the lift arms by transmitting the movements of the plurality of the pivot members to the PTO lever and the clutch lever. With this configuration, since an upward movement of the lift arms is divided into two different directions using the pivot plate which functions as a cam and the pivot members which function as a plurality of cam followers, the structure as a whole is complicated and requires many components. And, the manufacturing process also requires a high degree of accuracy and assembling process is complicated and takes a great deal of time and efforts.

The riding mower described in [2] above is configured to feed back the motion of the lift arms to the PTO lever and the clutch lever by connecting a push-pull wire to the lift arms, and connecting the inner wire of the push-pull wire to the PTO clutch lever, and by connecting the outer wire to the raising-and-lowering control lever of the mower. Although structure is simplified by using the simple push-pull wire as a linkage structure with this configuration, since the force is transmitted by the abutting of the push pull wire with each lever, it is hard to set up a linkage timing with sufficient accuracy and the accuracy of the linkage may further decline by the elongation of the wire with the passage of time.

SUMMARY OF THE INVENTION

An object of the present invention is to provide a simple operatively connecting mechanism for a riding mower by which driving power to the mower unit, provided to the vehicle body such that the unit can be raised and lowered, may be accurately disengaged when the mower unit is raised or lifted to a predetermined height.

In a riding mower comprising a mower unit supported to the vehicle body such that the mower unit can be raised and lowered; a raising and lowering control lever; a raising and lowering mechanism for raising and lowering the mower unit based on a control displacement of the raising and lowering control lever from a neutral position; a PTO mechanism for engaging driving power to the mower unit based on a displacement of the clutch lever, which is operable to be moved between an engage position and a disengage position, to the engage position and disengaging the driving power to the mower unit based on a displacement of the clutch lever to the disengage position, the riding mower further comprises the following to achieve the object described above:

an operatively connecting mechanism having a first displacement transmitting path for feeding back a raising and lowering displacement of the raising and lowering mechanism to the raising and lowering control lever, and a second displacement transmitting path for feeding back the raising and lowering displacement to the clutch lever, wherein when the raising and lowering mechanism reaches a predetermined height, the operatively connecting mechanism transmits, to the raising and lowering control lever, a return-to-neutral displacement for returning the raising and lowering control lever to the neutral position, and transmits, to the clutch lever, a disengaging displacement for returning the clutch lever to the disengage position;

a first adjusting operation member for adjusting a triggering displacement at which the raising and lowering displacement is transmitted to the raising and lowering control lever as the return-to-neutral displacement;

a second adjusting operation member for adjusting a triggering displacement at which the raising and lowering displacement is transmitted to the clutch lever as the disengaging displacement.

Since adjusting operation members for adjusting a timing for returning the raising and lowering control lever to a neutral position and a timing for returning the clutch lever toward the disengage position in association with a raising operation of the raising and lowering mechanism are provided between the raising and lowering mechanism and the raising and lowering control lever and between the raising and lowering mechanism and the clutch lever at areas of operatively connecting mechanisms for feed back operations, a timing for returning the raising and lowering control lever to a neutral position and a timing for returning the clutch lever toward the disengage position in association with a raising operation of the raising and lowering mechanism can be accurately adjusted to obtain coordinated operation of those parts involved.

And the provision of the adjusting operation members allows for an operatively connecting mechanism having a simple structure without the need for a high precision cam or cam follower, or a coupling mechanism for operatively connecting to the cam and the cam follower.

In addition, with an ability to make adjustments, there is no need to assemble components with high degree of accuracy; thus, even when an assembly process is done relatively imprecisely with some spaces between components, accuracy can be achieved by post-assembly adjustments, which leads to another advantage that the assembly process is facilitated.

In accordance with one of the preferred embodiments of the present invention, the first displacement transmitting path and the second displacement transmitting path include a first connection rod and a second connection rod, respectively, that are pushed and pulled, the first adjusting operation member is formed as a mechanism to change a distance between a position at which the raising and lowering control lever is operatively connected and a position at which the raising and lowering mechanism is operatively connected, on the first connection rod, and the second adjusting operation member is formed as a mechanism to change a distance between a position at which the clutch lever is operatively connected and a position at which the raising and lowering mechanism is operatively connected, on the second connection rod.

The structure of the operatively connecting structure itself is made simple by using a connection rod, which has a simple structure, as the operatively connecting structure. In addition, since the timing of the coordinated operation can be adjusted by a mechanism to change a distance between a position at which the raising and lowering control lever or the clutch lever is operatively connected and a position at which the raising and lowering mechanism is operatively connected, on the respective connection rod, adjusting operation by an adjusting operation member is made easy and the mechanism has a structure that can be easily made simple, which are additional advantages.

In accordance with a particular configuration of the present invention, the raising and lowering mechanism has an actuator, a control unit for controlling the actuator, and one or more lift arms for converting a movement of the actuator to a raising and lowering displacement of the mower unit, and the operatively connecting mechanism is connected to the one or more of the lift arms. More specifically, the actuator is a hydraulic cylinder, and the control unit is a control valve operated by a displacement of the raising and lowering control lever.

In accordance with another preferred embodiment of the present invention, the displacement is transmitted, through a push operation of one of the first and second connection rods, to one of the raising and lowering lever and the clutch lever that is located closer to the one or more of the lift arms than the other one of the levers, and the displacement is transmitted, through a pull operation of the other of the first and second connection rods, to one of the raising and lowering lever and the clutch lever that is located further from the one or more of the lift arms.

That is, for the lever that is further away from the lift arm, the operatively connecting member such as a connection rod may be formed of a material with a smaller cross-sectional dimension without the need to be concerned about strength against buckling and bending when it is arranged such that the feedback is achieved by a pulling operation in association with raising of the lift arm, which leads to an advantage that the operatively connecting member may be made lighter.

And, for the lever that is closer to the lift arm, the operatively connecting member such as a connection rod would be able to withstand against a buckling or bending force when the distance the rod has to span is relatively short even if it does not have a large cross-sectional dimension and even when it is arranged such that the feedback is achieved by a pushing operation in association with the raising of the lift arm, which leads to an advantage of facilitating downsizing of the operatively connecting member.

While it may be possible to provide the feedbacks through mechanisms to pull both levers regardless of the distance to the lift arm, the following problem would arise.

That is, in order to have a structure to transmit a rising movement of the lift arm from one location on the lift arm to two directions, i.e. to the rising and lowering control lever and to the clutch lever, a complex mechanism for changing the amount of operation and for changing the direction of operation would be required to have the raising of the mower stopped and an disengagement of the clutch performed at a precise timing depending on the positions and the amounts of the operations of the levers. In addition, the need to provide a mechanism to allow each lever to be operated separately would further prevent simplification of the structure.

While it may be possible to connect each of separate locations on the lift arm to each of the levers separately, locations on the lift arm which suffer relatively little from the change in the angular position of the lift arm during its raising movement and which can also provide sufficient amounts of movement for operation would have to be very close to each other when the direction of the operation for both levers is the same, which leads to an entanglement of the connecting structure, leaving a possibility of preventing a simplification of the assembly process.

In contract, with the present invention, since the directions of the operations of the levers are different such that one lever is pulled and the other lever is pushed, the operatively connecting structures for transmitting the raising movement of the lift arm to two directions or systems may be located spaced apart from each other, making it possible to avoid entanglement of the operatively connecting structures.

Other features and advantages of the present invention will be made clear in the following description of the preferred embodiments with reference to the attached drawings.

DETAILED DESCRIPTION OF THE PREFERRED EMBODIMENTS

The preferred embodiment of the present invention is described next with reference to the attached drawings. Any feature of one embodiment may be combined with a feature from another embodiment, and such a combination is considered to be within the scope of the present invention, as long as there are no inconsistencies.

[Overall Structure of the Riding Mower]

Figure 1:
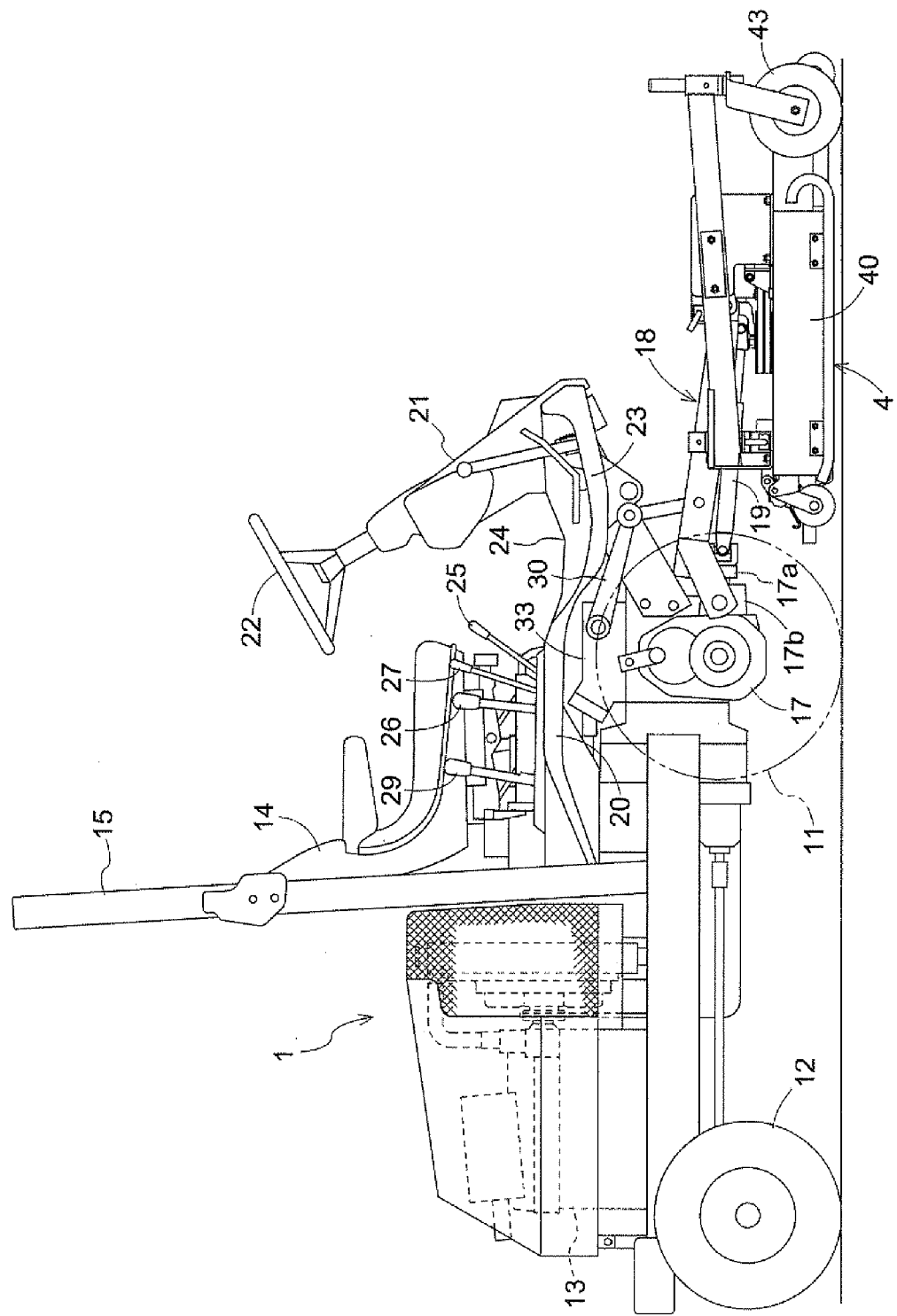
FIG. 1 is an overall side view of the riding mower.
Figure 2:
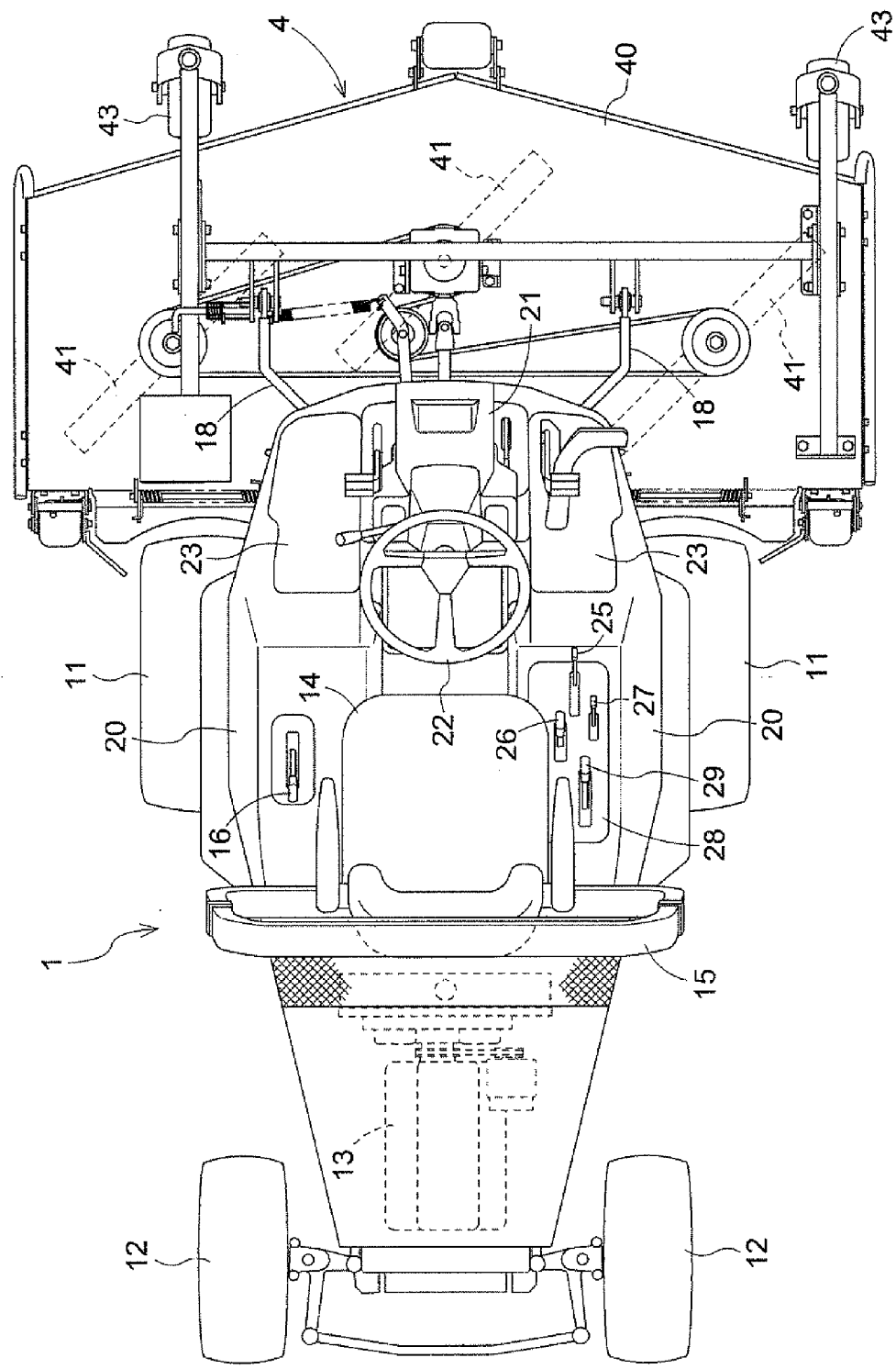
FIG. 2 is an overall plan view of the riding mower.
Figure 3:
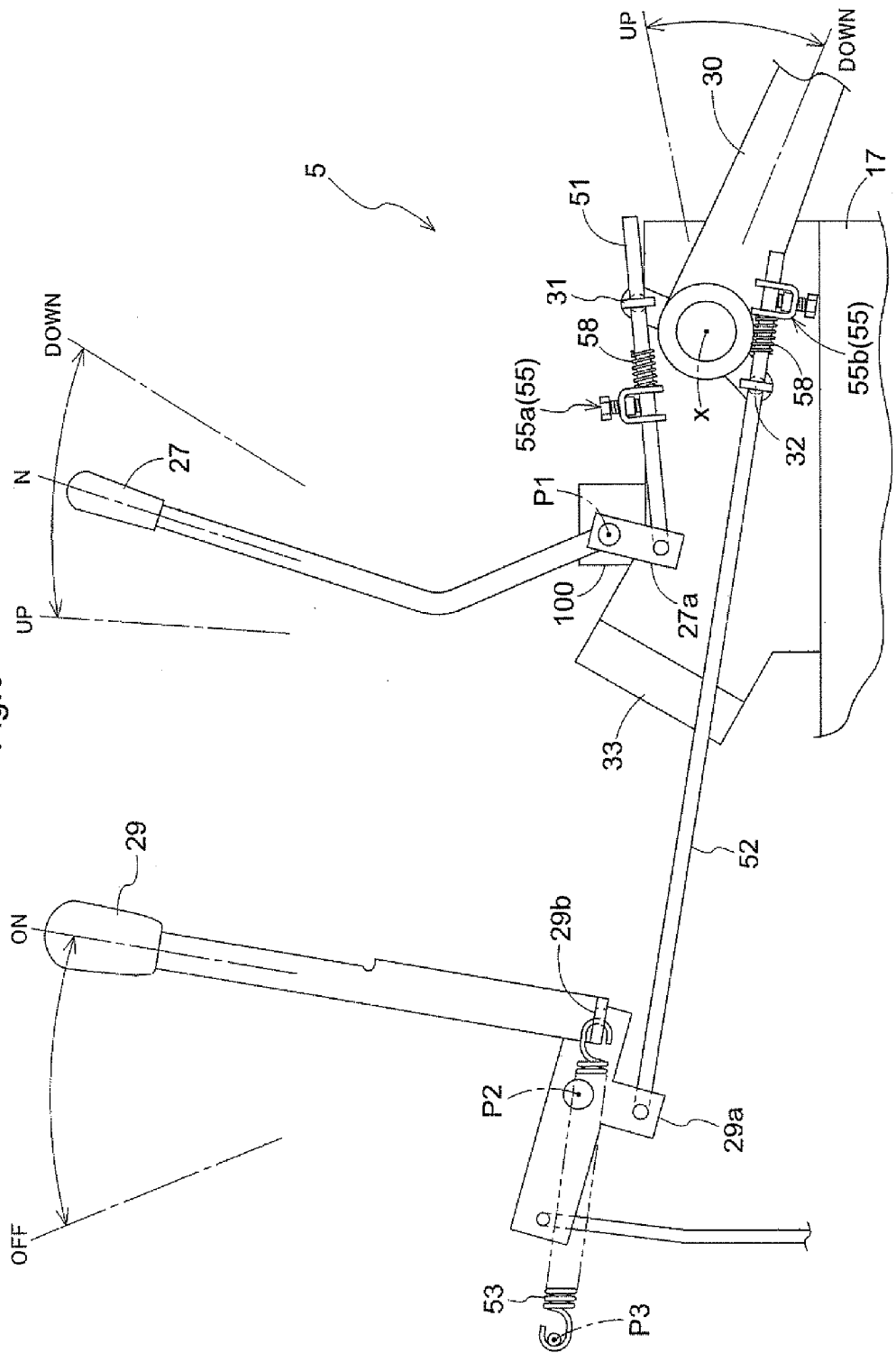
FIG. 3 is a side view showing the operatively connecting mechanism portion.
Figure 4:
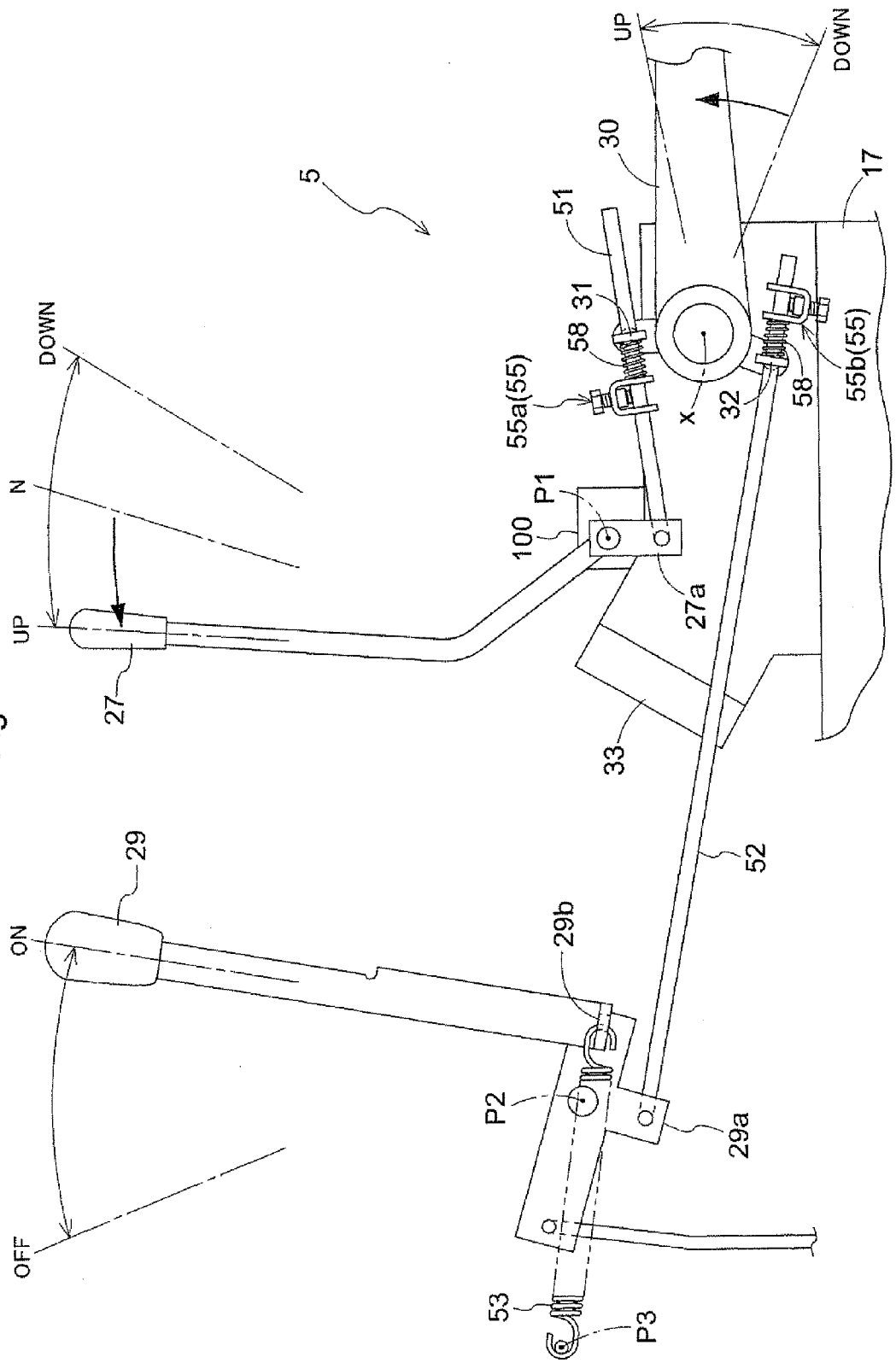
FIG. 4 is a side view showing the operatively connecting mechanism portion.
Figure 5:
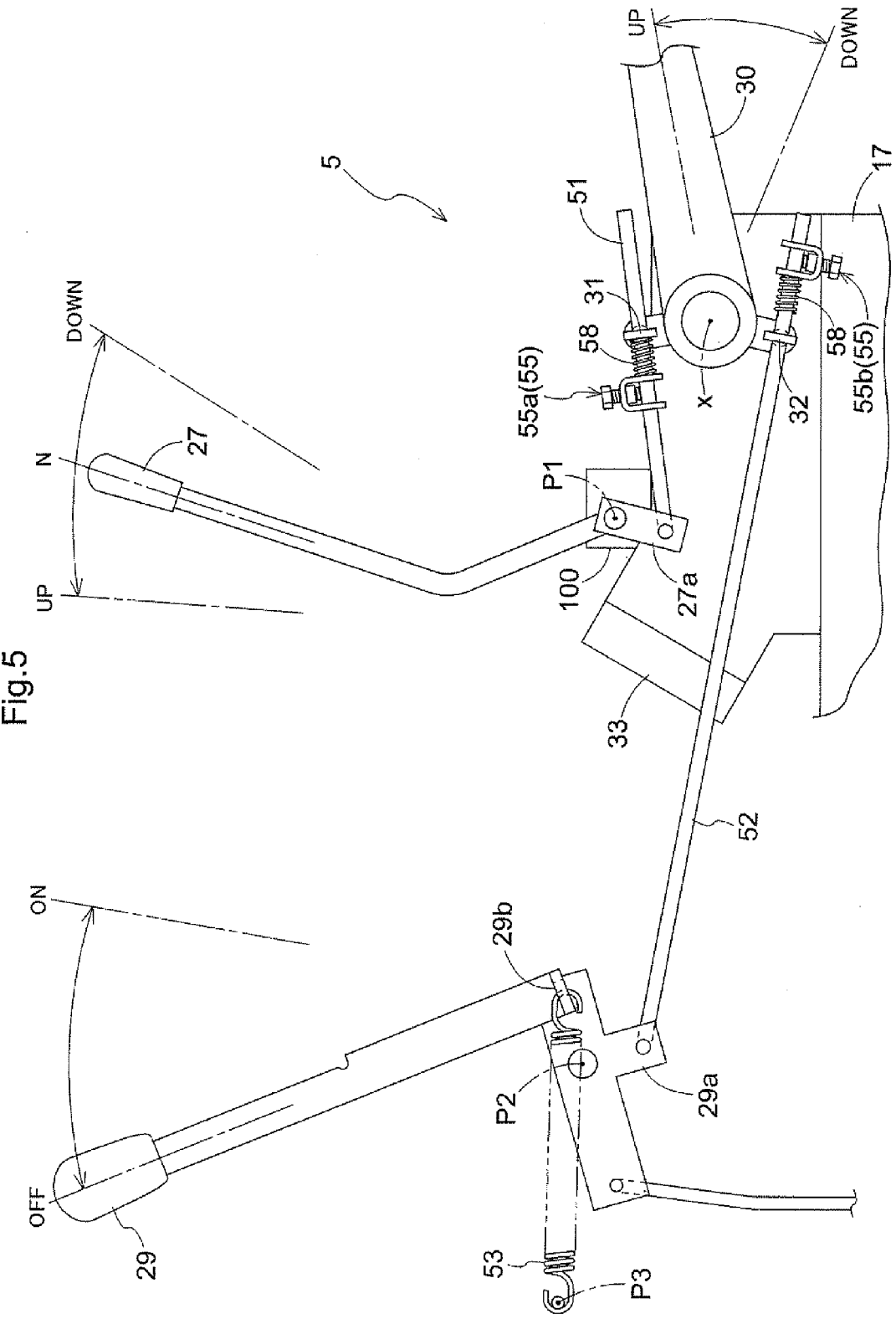
FIG. 5 is a side view showing the operatively connecting mechanism portion.

An overall side view of the riding mower in accordance with the present invention is shown in FIG. 1, and a plan view of the entire mower is shown in FIG. 2.

This riding mower has the right-and-left pair of driven front wheels 11 in the front of the vehicle body 1, and right-and-left pair of steerable and driven rear wheels 12 in the rear. A power source section having an engine 13 is provided in the rear of the vehicle body 1, and a driving section with a driver's seat 14 is located forwardly of this power source. And a ROPS 15 is arranged between the driving section and the power source section to stand vertically from the vehicle body so as to extend to circumvent the area above the driver's seat 14.

A mower unit 4 is connected to the front of the vehicle body 1 through a linkage mechanism 18 extending toward the front of or forwardly of the vehicle body from the front transmission case 17 which, at least in part, forms a vehicle body frame. The mower actuating line is configured such that the driving force from the engine 13 is transmitted from the power take off shaft 17a provided in the front transmission case 17 to the mower unit 4 through the power transmission shaft 19.

In the driving section 5, the driver's seat 14 is located between the right and left pair of front-wheel fenders 20 in plan view; a steering column 21 is arranged to stand vertically at a location forwardly of the driver's seat 14 and at the forward end of the vehicle body; and a steering wheel 22 is rotatably supported to the upper portion of this steering column 21. And foot rests 23 are located on both sides of the lower portion of the steering column 21, and a central floor portion 24 formed to cover the area above the front transmission case 17 is provided between the foot rests 23.

The right and left pair of front-wheel fender 20, the right and left pair of foot rests 23, and the central floor portion 24, are formed by an upper structural element which is formed of a single sheet metal member that is press-molded to form the desired shapes for these parts and to have one integral component.

As shown in FIG. 2, a main speed change lever 25, a PTO speed change lever 26, a raising-and-lowering control lever 27, and a PTO clutch lever 29 are located to one lateral side of the driver's seat 14 of the driving section 5, such that they extend through the front-wheel fender 20 and the guide member 28 which is made of synthetic resin and is arranged in the upper surface of the front-wheel fender 20. On the other lateral side of the driver's seat 14 is a lever 16 for selective switchover between a four-wheel-drive state in which power is transmitted to both the front and the rear wheels 1 and 2, and a two-wheel-drive state in which the power is transmitted only to the front wheels 1 while no power is transmitted to the rear wheels 2.

The main speed change lever 25 is adapted to change the traveling speed of the vehicle by performing the speed change operation of the travel speed change device as the lever 25 is pivoted about a pivot axis of a speed change operation shaft (not shown) of the travel speed change device (not shown) which is a hydrostatic continuously variable transmission supported by the front transmission case 7, and is pivoted along the guide slot of the guide member 28 in the fore-and-aft direction of the vehicle body.

The PTO speed change lever 26 is adapted to change the rotational speed of the power take off shaft 17a by performing a speed change operation of the PTO speed change device as the lever 26 is pivoted about a pivot axis of a speed change operation shaft (not shown) of the PTO speed change device (not shown) located within the front transmission case 7, and is pivoted along the guide slot of the guide member 28 in the fore-and-aft direction of the vehicle body.

The raising and lowering control lever 27 is adapted to raise and lower the mower unit 4 by operating the lift cylinder 33 for actuating the lift arms 30 by being pivoted about a pivot axis of an operation shaft of a hydraulic control valve 100 and along the guide slot of the guide member 28 in the fore-and-aft direction of the vehicle body.

The PTO clutch lever 29 functions as a clutch lever for engaging and disengaging power to the mower unit 4, and is configured to switch the PTO clutch 17b located within the front transmission case 17 between two positions of the clutch engaged (ON) state and a clutch disengaged (OFF) state. Power transfer to the mower unit 4 is enabled through the power take off shaft 17a in the clutch engage position ON. And the actuation of the power take off shaft 17a is ceased in the clutch disengage position OFF and power transfer to the mower unit 4 is disengaged.

[Components Related to the Mower Unit]

The linkage mechanism 18 for the mower unit 4 is hung and supported by the lift arms 30. That is, the raising-and-lowering mechanism which raises and lowers the mower unit 4 in the present invention includes, among other things, the linkage mechanism 18, the lift arm 30, the raising and lowering cylinder 33, and the hydraulic control valve 100.

As the right and left pair of lift arms 30 which support the linkage mechanism 18 are pivoted vertically through extension and retraction of the raising and lowering cylinder 33, the linkage mechanism 18 is pivoted up and down or vertically relative to the front transmission case 17 to vertically move the mower unit 4 between a lowered operating state in which the ground contacting gage wheels 43 are in contact with the ground, and a raised non-operating state in which the ground contacting gage wheels 43 are lifted above and off the ground.

The mower unit 4 mows lawn in its lowered operating state while the vehicle body is traveling. This mower unit 4 is configured to be a mulching type which cuts grass with the rotating cutting blades 41 which are driven about vertically extending axes at two or more locations spaced apart in the lateral direction inside the cutting blade housing 40.

[Components Related to Raising-And-Lowering Connection Mechanism]

As shown in FIGS. 3 through 6, a lift arm 30 which raises and lowers the mower unit 4 is operatively connected to the raising-and-lowering control lever 27 and the PTO clutch lever 29 through an operatively connecting mechanism 5 configured as follows for a feedback.

Figure 6:
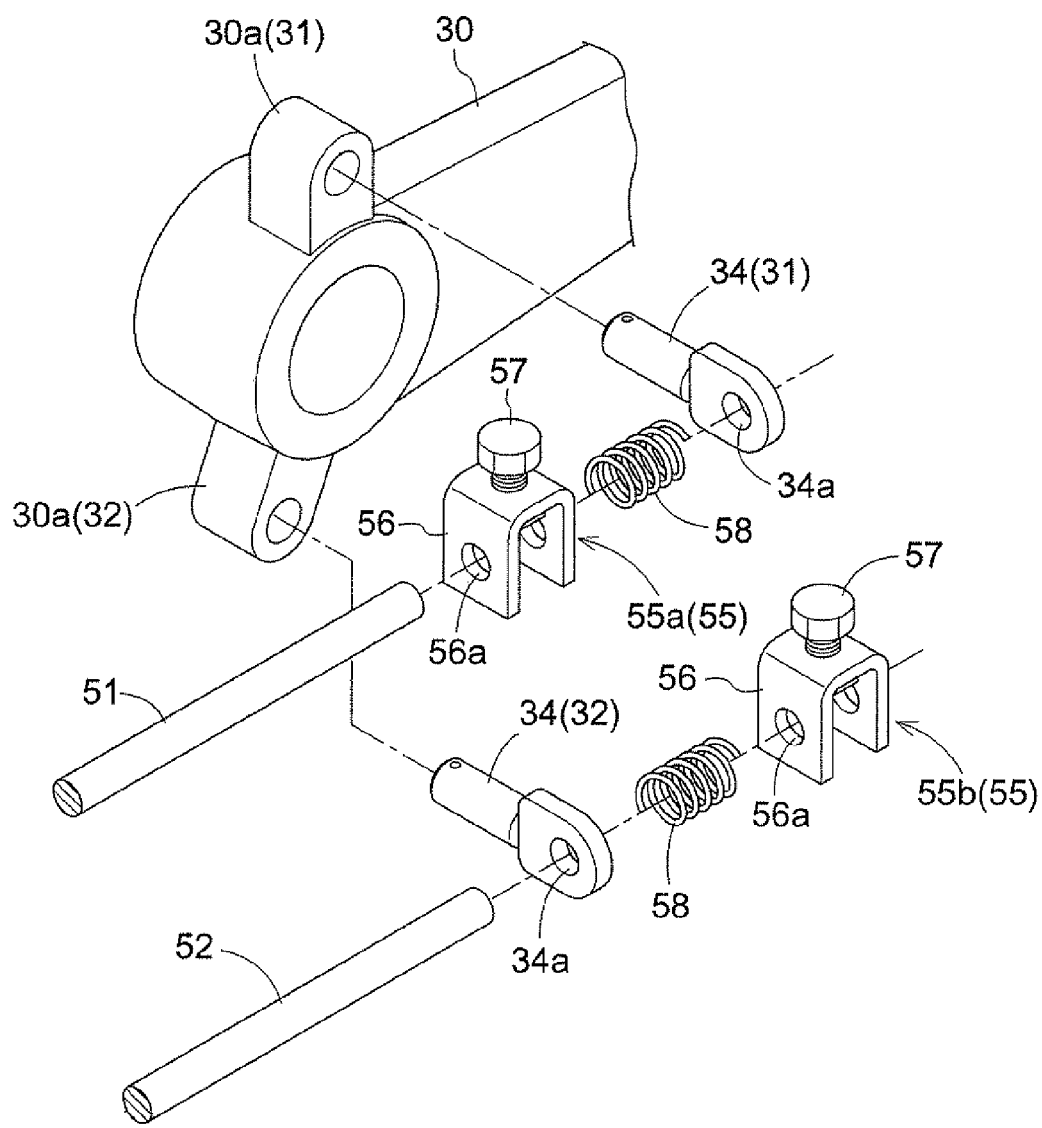
FIG. 6 is a perspective view showing the adjusting operation member portion.

That is, as components associated with the lift arm, connection engagement portions 31 and 32 are provided at a location above and a location below in the peripheral area of the pivot x of the lift arm 30. As shown in FIG. 6, these connection engagement portions 31 and 32 include boss portions 30a and 30a projecting from upper and lower locations of the perimeter area of the lift arm 30, and the linking pins 34 and 34 inserted into and for rotation relative to those boss portions 30a and 30a. The guide holes 34a are formed in the linking pins 34 for slidably supporting the linkage rods 51 and 52, described below, which extend through the guide holes 34a.

In the raising and lowering control lever 27 and the PTO clutch lever 29, connecting portions for the linkage rods 51 and 52 are formed in the load force application portions 27a and 29a, to which load forces are applied, below the lever pivots P1, P2 of the raising-and-lowering control lever 27 and the PTO clutch lever 29.

And the first connection rod 51 extends between the load force application portion 27a, to which the load force is applied, of the raising-and-lowering control lever 27 and the connection engagement portion 31 on the upper side of the peripheral portion of the lift arm 30, and is connected to the connection engagement portion 31 through the first adjusting operation member 55a described below. That is, the extended end of the first connection rod 51 is inserted and extends through the guide hole 34a formed in the linking pin 34 of the connection engagement portion 31, and the first adjusting operation member 55a is provided on the first connection rod 51 at a location closer to the load force application portion 27a of the raising-and-lowering control lever 27 than the linking pin 34.

And the second connection rod 52 extends between the load force application portion 29a, to which the load force is applied, of the PTO clutch lever 29 and the connection engagement portion 32 on the lower side of the peripheral portion of the lift arm 30, and is connected to the connection engagement portion 32 through the second adjusting operation member 55b described below. That is, the extended end of the second connection rod 52 is inserted and extends through the guide hole 34a formed in the linking pin 34 of the connection engagement portion 32, and the second adjusting operation member 55b is provided on the second connection rod 52 at a location further away from the load force application portion 29a of the PTO clutch lever 29 than the location of the linking pin 34.

Each of the first and second connection rods 51 and 52 is formed of a round-bar material. And the second connection rod 52, provided between the connection engagement portion 32 on the lower side of the peripheral portion of the lift arm 30 and the load force application portion 29a of the PTO clutch lever 29, whose distance is greater than the distance between the connection engagement portion 31 in on the upper side of the peripheral portion of the lift arm 30 and the load force application portion 27a of the raising-and-lowering control lever 27, is formed of a longer bar than the first connection rod 51. However, the diameter of the second connection rod 52 is less than or equal to the diameter of the first connection rod 51.

The first and second adjusting operation members 55a and 55b provided near the ends, of the first and second connection rods 51 and 52, opposite from the ends that are connected to the load force application portions 27a and 29a of the levers 27 and 29 are provided to adjust the positions at which the connection engagement portions 31 and 32 push and pull. As shown in FIG. 6, each of the first and second adjusting operation members 55a and 55b has a channel-shaped holder 56 having a through hole 56a that fits around the first connection rod 51 or the second connection rod 52 for relative sliding movements, and a stop bolt 57 for fixing the holder 56 to prevent sliding movements relative to the first connection rod 51 or the second connection rod 52.

With regard to the parts associated with the first connection rod 51, the first adjusting operation member 55a is provided between the connection engagement portion 31 on the upper side of the peripheral portion of the lift arm 30 and the raising-and-lowering control lever 27. And as the lift arm 30 is raised or lifted, the connection engagement portion 31 pushes the first adjusting operation member 55a toward the raising-and-lowering control lever 27, and thus the first connection rod 51 is pushed toward the raising-and-lowering control lever 27.

Similarly, regarding the parts associated with the second connection rod 52, the second adjusting operation member 55b is provided at a location further away from the PTO clutch lever 29 than the connection engagement portion 32 in the lower peripheral portion of the lift arm 30. And as the lift arm 30 is raised or lifted, the connection engagement portion 32 pushes the second adjusting operation member 5b away from the PTO clutch lever 29 to pull the second connection rod 52.

The adjusting operation member 55 is used to change the timing of the coordinated operation between the raising-and-lowering control lever 27 and the PTO clutch lever 29, on the one hand, and the lifting operation of the lift arm 30, on the other hand, by changing the position of the channel-shaped holder 56 in the lengthwise direction of the linkage rod 51 or 52 after loosening the stop bolt 57 and by fixing the holder 56 at an appropriate position by tightening the stop bolt 57.

The timing of the coordinated operation by the adjusting operation member 55 is set such that, as the lift arm 30 is lifted and reaches a predetermined height, the raising-and-lowering control lever 27 is pushed from the rising operation position UP to the neutral stop position N by the first connection rod 51 that is in turn pushed by the connection engagement portion 31 on the upper side of the peripheral portion of the lift arm 30, and such that the PTO clutch lever 29 is returned from the clutch engage position ON to the clutch disengage position OFF by the second connection rod 52 that is pulled by the connection engagement portion 32 on the lower side of the peripheral portion of the lift arm 30.

A shock absorbing coil spring 58 is provided between the adjusting operation member 55 on the linkage rod 51 or 52, and the connection engagement portion 31 or 32 on the lift arm 30.

This coil spring 58 is compressed to a degree to suppress chattering or undesired movements between the linkage rod 51 or 52 and the adjusting operation member 55 or the connection engagement portion 31 or 32 when the raising and lowering control lever 27 is in the rise position UP, or the PTO clutch lever 29 is in the clutch engage position ON with the mower unit 4 in the lowered operating position. And the coil spring 58 is compressed nearly completely when the mower unit 4 begins to be lifted so that the action of the connection engagement portion 31 or 32 associated with the rise operation of the lift arm 30 is transmitted to the associated adjusting operation member 55.

A coil spring 53 is provided and stretched between a bottom position 29b near the pivot P2 of the PTO clutch lever 29 and a fixed point P3 on the vehicle body 1 such that a virtual line segment connecting the fixed point P3 on the vehicle body 1 and the bottom position 29b near the pivot P2 moves back and forth across the pivot P2, that is, such that the bottom position 29b moves across a dead point line connecting the pivot P2 and the fixed point P3. Therefore, an operation of this PTO clutch lever 29 from the engage position ON to the disengage position OFF is coupled to the rising operation of the lift arm 30 and is assisted by the urging force of the coil spring 53 while the operation from the disengage position OFF to the engage position ON is performed manually against the urging force of the coil spring 53 and over the dead point line.

Alternative Embodiment 1

The operatively connecting mechanism 5 for feedback operation is not limited to round-bar shaped first and second connection rods 51 and 52 as described in the best embodiment and may be of any shape, for example, a pipe-shaped, shape-steel, or plate-shaped.

And, the wire may be used for the side puffing operation is performed, instead of the linkage rods 51 and 52.

Alternative Embodiment 2

The adjusting operation member 55 is not limited to the structure using a channel-shaped holder 56 and the stop bolt 57 as described in the best embodiment and may have any structure for changing the position in the operatively connecting mechanism 5 at which the pushing and pulling force is applied.

And, the adjusting operation member 55 may be provided between the rod and the lever 27 or 29 instead of between the rod and the connection engagement portions 31 or 32 near the lift arm 30.

Alternative Embodiment 3

The mower unit 4 is not limited to the mulching type described in the best embodiment but may be, for example, a side discharge type in which cut grass is transported through inside of the cutting blade housing 40 to the outlet 42 located in the horizontal end side of the blade housing 40 by the wind generated by the rotation of the rotation cutting blade 41, and is discharged out of the blade housing 40 from the outlet 42, or a rear discharge type which discharges cut grass to the vehicle body back side, or any other appropriate type.

What is claimed is:
1. A riding mower comprising:
a vehicle body;
a mower unit supported to the vehicle body such that the mower unit can be raised and lowered;

a raising and lowering control lever disposed on the vehicle body and operable to be moved between a neutral position and a raising position and between the neutral position and a lowering position;

a raising and lowering mechanism, including one or more members operatively connected to the raising and lowering control lever and one or more members operatively connected to the mower unit, for raising and lowering the mower unit based on a control displacement of the raising and lowering control lever from the neutral position;

a clutch lever disposed on the vehicle body and operable to be moved between an engage position and a disengage position;

a PTO mechanism, operatively connected to the clutch lever and including one or more members operatively connecting a transmission clutch of the mower to the mower unit, for engaging driving power to the mower unit based on a displacement of the clutch lever to the engage position and disengaging the driving power to the mower unit based on a displacement of the clutch lever to the disengage position;

an operatively connecting mechanism having a first displacement transmitting path comprised of one or more members operatively connected to the raising and lowering lever and to the raising and lowering mechanism for feeding back a raising and lowering displacement of the raising and lowering mechanism to the raising and lowering control lever, and a second displacement transmitting path comprised of one or more members operatively connected to the clutch lever and to the raising and lowering mechanism for feeding back the raising and lowering displacement of the raising and lowering mechanism to the clutch lever, wherein when the raising and lowering mechanism reaches a predetermined height, the operatively connecting mechanism transmits, to the raising and lowering control lever, a return-to-neutral displacement having a distance sufficient for returning the raising and lowering control lever to the neutral position from the raising position and from the lowering position, and transmits, to the clutch lever, a disengaging displacement having a distance sufficient for returning the clutch lever to the disengage position from the engage position;

a first adjusting operation member operatively connected to the first displacement transmitting path of the operatively connecting mechanism for adjusting a first triggering displacement, at which the raising and lowering displacement of the raising and lowering mechanism is transmitted to the raising and lowering control lever as the return-to-neutral displacement; and a second adjusting operation member operatively connected to the second displacement transmitting path for adjusting a second triggering displacement, at which the raising and lowering displacement of the raising and lowering mechanism is transmitted to the clutch lever as the disengaging displacement.

2. A riding mower as defined in claim 1, wherein
the one or more members of the first displacement transmitting path and the one or more members of the second displacement transmitting path include a first connection rod and a second connection rod, respectively, that are pushed and pulled, the first adjusting operation member is formed as a mechanism to change a distance between a position at which the raising and lowering control lever is operatively connected and a position at which the raising and lowering mechanism is operatively connected, on the first connection rod, and the second adjusting operation member is formed as a mechanism to change a distance between a position at which the clutch lever is operatively connected and a position at which the raising and lowering mechanism is operatively connected, on the second connection rod.

3. A riding mower as defined in claim 2, wherein
the one or more members of the raising and lowering mechanism include an actuator, a control unit for controlling the actuator, and one or more lift arms for converting a movement of the actuator to a raising and lowering displacement of the mower unit, and wherein the operatively connecting mechanism is connected to the one or more of the lift arms.

4. A riding mower as defined in claim 3, wherein
the actuator is a hydraulic cylinder, and the control unit is a control valve operated by a displacement of the raising and lowering control lever.

5. A riding mower as defined in claim 3, wherein
the return-to-neutral displacement or the disengaging displacement is transmitted, through a push operation of one of the first and second connection rods, respectively, to one of the raising and lowering lever and the clutch lever that is located closer to the one or more of the lift arms than the other one of the levers, and wherein the return-to-neutral displacement or the disengaging displacement is transmitted, through a pull operation of the other of the first and second connection rods, respectively, to one of the raising and lowering lever and the clutch lever that is located further from the one or more of the lift arms.

* * * * *